US012732298B2

(12) United States Patent
Khotimsky et al.

(10) Patent No.: US 12,732,298 B2
(45) Date of Patent: Sep. 8, 2026

(54) OPTICAL NETWORK UNIT TESTING IN A MULTI-WAVELENGTH PASSIVE OPTICAL NETWORK SYSTEM

(71) Applicant: Verizon Patent and Licensing Inc., Basking Ridge, NJ (US)

(72) Inventors: Denis A Khotimsky, Westborough, MA (US); Gregory K Sherrill, Herndon, VA (US); Rajesh Yadav, Ashland, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 339 days.

(21) Appl. No.: 18/617,677

(22) Filed: Mar. 27, 2024

(65) Prior Publication Data

US 2025/0310020 A1 Oct. 2, 2025

(51) Int. Cl.

| | |
|---|---|
| ***H04B 10/079*** | (2013.01) |
| ***H04B 10/27*** | (2013.01) |
| ***H04B 10/294*** | (2013.01) |
| ***H04J 14/02*** | (2006.01) |

(52) U.S. Cl.

CPC ........ *H04J 14/0227* (2013.01); *H04B 10/079* (2013.01); *H04B 10/27* (2013.01); *H04B 10/294* (2013.01); *H04J 14/0235* (2013.01); *H04J 14/0249* (2013.01); *H04Q 2213/295* (2013.01)

(58) Field of Classification Search

CPC H04B 10/079; H04J 14/0227; H04J 14/0235; H04J 14/0249; H04Q 2213/295

USPC .......................................... 398/34, 63, 69, 95

See application file for complete search history.

(56) References Cited

U.S. PATENT DOCUMENTS

2013/0336655 A1* 12/2013 Grobe .................. H04J 14/025 398/67
2016/0006608 A1* 1/2016 Khotimsky ......... H04L 41/0806 398/67
2016/0072607 A1* 3/2016 Wen .................... H04J 14/0257 398/79
2016/0073180 A1* 3/2016 Khotimsky ......... H04J 14/0227 398/25
2017/0288804 A1* 10/2017 Gaudino ............. H04J 14/0227

OTHER PUBLICATIONS

Rajesh Yadav, "Verizon OpenOMCI Specification", Jun. 2017, 108 pages.

* cited by examiner

*Primary Examiner* — Li Liu

(57) ABSTRACT

One or more computing devices, systems, and/or methods for optical network unit testing are provided. An optical network unit is activated to connect through a multi-channel system to a wavelength channel. A command is issued to the optical network unit to restrict activation requests to a set of wavelength channels allowed for activation by the optical network. In response to detecting a wavelength channel switch being performed by the optical network unit, a target wavelength channel to which the optical network unit switched is detected. Operation of the optical network unit is validated based upon the target wavelength channel.

20 Claims, 10 Drawing Sheets

OPTICAL NETWORK UNIT TESTING IN A MULTI-WAVELENGTH PASSIVE OPTICAL NETWORK SYSTEM

BACKGROUND

A fiber-optic access network provides user equipment such as televisions, computers, smart devices, office equipment, and/or other devices with connectivity to a service provider such as to obtain an Internet connection. The user equipment can use the Internet connection to access websites and services. The fiber-optic network includes various network components for establishing a communication link such as an optical fiber to the home (FTTH) communication link. The fiber-optic network may include optical network units and optical network terminals that utilize optical fiber to connect to a passive optical network in order to communicate with an Internet service provider in order to obtain the Internet connection. In a multi-wavelength passive optical network system, the optical line terminal and the optical network units may communicate over two or more bidirectional wavelength channels. The initial selection and the dynamic control of the wavelength channel used for communication between the optical line terminal and a particular optical network unit is subject to operational preferences.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
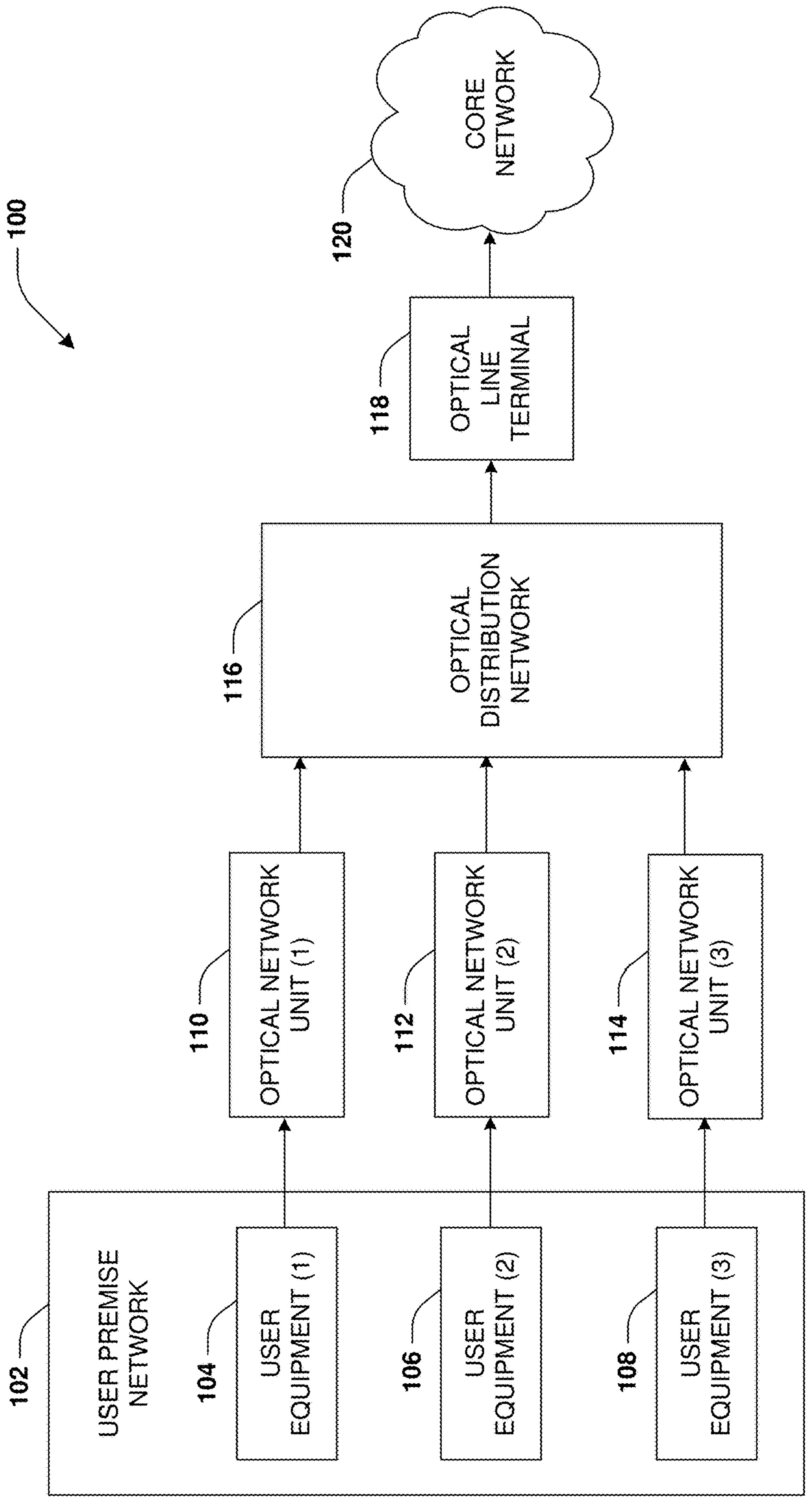
FIG. 1 illustrates an example of optical network units providing communication for user equipment, in accordance with an embodiment of the present technology.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof. The following provides a discussion of some types of computing scenarios in which the disclosed subject matter may be utilized and/or implemented.

Systems and methods are provided for testing optical network units. An optical network unit connects user equipment (e.g., a television, a smart device, a computer, etc.) to a fiber-optic network such as for obtaining an Internet connection from a service provider. The optical network unit converts optical signals from the fiber-optic network to electrical signals for the user equipment and vice versa, thus providing efficient data transmission. The optical network unit may receive broadcast data sent by an optical line terminal. The optical network unit may implement wavelength mobility where the optical network unit can switch between wavelength channels used for network traffic transport. The optical network unit may switch to a wavelength channel during activation, during a planned handover in response to a handover command, or during a fault protection handover in order to provide continued operation in response to a detected fault. The wavelength channel switching during activation can take a relatively long amount of time such as seconds, which is not desirable for planned handovers and fault protection handovers. These handover-related wavelength channel switching scenarios may need to occur within a very short time span that will keep an overall service outage at about 50 ms or less or some other timeframe, for example. Unfortunately, some optical network unit implementations may not function correctly to perform fast path switching in order to switch to a target wavelength channel within a timeframe that will not cause performance issues, a poor user experience, violate service level agreements (SLAs), etc.

As provided herein, the disclosed testing procedure is capable of testing an optical network unit to detect implementation failures where the optical network unit is not performing fast path switching when switching to target a wavelength channel during certain switching scenarios such as planned handovers and fault protection handovers. In some embodiments, the testing procedure may be implemented by a test system that may test the optical network unit within a testing environment (e.g., testing before deployment to a production environment), or may perform field testing while the optical network unit is deployed within the production environment. The test system may be coupled to or incorporated within an optical line terminal used as part of testing the optical network unit. The optical network unit is tested to determine whether the optical network unit is performing wavelength channel switching fast enough for certain switching scenarios, such as performing a fast path switching (e.g., switching within 50 ms of less) for planned handovers and fault protection handovers.

To perform the test, the optical network unit is activated to connect through a multi-channel system to an optical line terminal. The optical line terminal is controlled, such as by the test system, to issue a configuration command to restrict activation requests to a specific set of wavelength channels allowed for activation. Because activation is slow, the optical network unit activation should be avoided as a step in fast path switching. Once the optical network unit is activated, a fast path switching command is issued to the optical network unit with the specified target wavelength channel outside of the set within the set of wavelength channels allowed for activation. If the optical network unit switches to a wavelength channel within the set of wavelength channels allowed for activation, then the optical network unit performed a slow path switching that could violate SLAs and result in performance issues during planned handovers and/or fault protection handovers. When the optical network unit performs a wavelength channel switch, an effective wavelength channel to which the optical network unit switches is detected. If the effective wavelength channel is within the set of wavelength channels allowed for activation, then operation of the optical network unit is invalidated because the optical network unit performed slow path switching, which is too slow for desired operation. If the effective wavelength channel matches the specified target wavelength channel which is not within the set of wavelength channels allowed for activation, then operation of the optical network unit is validated because the optical network unit did not perform the slow path switching, but instead performed fast past switching to a different wavelength not within the set of wavelength channels allowed for activation.

The test is capable of efficiently detecting whether the optical network unit is switching within acceptable time constraints. Operation of the optical network unit can be validated at a low cost without expensive equipment (e.g., testing equipment could range from tens of thousands to a hundred thousand dollars) and without relying on vendors to provide accurate information or provide internal access for testing. The operation of the optical network unit can be tested and validated before deployment so that SLAs are not violated, user equipment do not experience interruptions or performance degradation, and users do not have poor user experiences. The operation of already deployed optical network units can be tested such as on a periodic basis to ensure proper operation, which provides the ability to quickly identify and fix any operational issues such as slowing switching for certain switching scenarios.

FIG. 1 illustrates an example of optical network units providing communication for user equipment. An optical line terminal 118 may provide connectivity to a core network 120 so that user equipment can connect and communication over the core network 120 such as to obtain an Internet connection in order to access websites and services. The optical line terminal 118 may be configured as a service provider endpoint of a passive optical network such as an optical distribution network 116. The optical line terminal 118 may convert between electrical signals used by service provider equipment of the core network 120 and fiber optic signals used by the optical distribution network 116. The optical line terminal 118 may perform multiplexing between conversion devices on the other end of the optical distribution network 116, such as between a first optical network unit 110, a second optical network unit 112, and a third optical network unit 114. The first optical network unit 110 may be connected to first user equipment 104 (e.g., a smart television) over a user premise network 102. The second optical network unit 112 may be connected to second user equipment 106 (e.g., a printer) over the user premise network 102. The third optical network unit 114 may be connected to third user equipment 108 (e.g., a laptop) over the user premise network 102

The optical network units efficiently convert optical signals in the optical distribution network 116 to electrical signals for delivery to user equipment and vice versa. With the optical line terminal 118, the optical network units can provide a wide range of broadband services to connected users such as Internet browsing, voice over IP, high definition television, and other services. In some embodiments, an optical network unit is also referred to as an optical network terminal. The optical network units may be capable of selecting broadcast data sent by the optical line terminal 118, responding to or implement range and power control commands from the optical line terminal 118 such as to perform channel switching, caching and upstream transmission of data to an optical line terminal distribution window, providing data, IPTV, and voice services, implementing advanced quality of service features based upon service level agreements, and/or a variety of other functionality.

An optical network unit may provide efficient data transmission by converting optical signals to electrical signals in order to ensure seamless data transmission over fiber optic cables, which boosts network efficiency, minimizes latency, and guarantees reliable connectivity. The optical network unit may provide centralized control by providing service providers with the ability to centrally manage and control communication between optical fiber infrastructure and end-user devices (user equipment), which facilitates efficient troubleshooting, provisioning, and monitoring of network performance. The optical network unit may provide scalability by serving as a termination point such that service providers can connect multiple optical network units to a single optical line, thus expanding the ability to serve a larger customer base while maintaining high-speed connections. The optical network unit is used to reduce network deployment and maintenance costs for service providers by leveraging a passive optical network so that service providers can provide affordable high-speed internet and other services to residential, commercial, and industrial users.

In order to provide these technical advantages, the optical network unit must be implemented correctly to perform fast path switching for certain switching scenarios such as planned handovers and fault protection handovers. In particular, if the optical network unit is unable to perform wavelength channel switching fast enough, then service interruptions, degraded performance, failures to satisfy SLAs, and poor user experiences can occur. Accordingly, the disclosed testing procedure and test system are capable of efficiently and cost effectively testing the operation of optical network units to ensure that the optical network units are switching channels fast enough to satisfy certain benchmarks and SLAs (e.g., switching from one wavelength channel to a different wavelength channel fast enough that any service disruption is kept to 50 ms of less).

In some embodiments of testing an optical network unit, a channel retuning trigger event may occur, such as an intermittent loss of downstream synchronization that persists over a specified duration that triggers a planned handover or where a command is received by the optical network unit from the optical line terminal to switch operating channel wavelengths as part of a fault protection handover. With these channel retuning trigger events (switching scenarios to perform handovers), the optical network unit is required to execute fast path switching to a known wavelength channel (e.g., a preconfigured wavelength for the fault protection handover, or a wavelength specified by the command for a planned handover). In some embodiments, the overall service outage from fast path wavelength switching can be kept within 50 ms (e.g., a benchmark value from a regulatory compliance point of view) where a physical transceiver is tuned to around 25 ms, the optical network unit properly supports the optical line terminal 118 such as where there is consistent ranging support, readily usable grants within a target wavelength channel, and there is an available service configuration within the target wavelength channel. If the optical network unit is not competent enough to execute fast path switching, then an activation/reactivate path of wavelength channel switching is used (slow path switching), which consumes time on the order of several seconds such that the benchmarks and SLAs cannot be satisfied.

The disclosed testing technique provides a low cost and reliable wavelength mobility text outcome verification. In some embodiments, the test turns off optical network unit activation possibility in a target wavelength channel. If the optical network unit executes wavelength channel switching via a reactivation path (e.g., a slow path switching that includes an activation state that is slow), then the optical network unit would be unable to activate in the target wavelength channel and would activate in a different wavelength channel instead. The test outcome is verified by checking the wavelength channel to which the optical network unit switched upon a channel tuning trigger event (e.g., wavelength channel switching as part of a planned handover or a fault protection handover). If the optical network unit switched to the target wavelength channel that was not supported by activation/reactivation, then the optical network unit is determined to be operating as expected/desired and performed fast path switching. If the optical network unit switched to any other wavelength channel that was supported by activation/reactivation, then the optical network unit is determined to not be operating as expected/desired (the optical network unit is not operating correctly) and performed slow path switching. If the optical network unit is not operating correctly, then a remedial action can be performed such as marking the optical network unit as being defective, specifying that the optical network unit is not to be deployed, or scheduling a replacement for the optical network unit if the optical network unit was already deployed.

In some embodiments of performing the test, the optical line terminal 118 issues commands to the optical network unit such that the optical network unit is only allowed to utilize certain wavelengths (wavelength channels) for activation (reactivation) requests, which utilizes slow path switching. Wavelength that are not valid for activation requests are usable for fast path switching. If the optical network unit performs a wavelength channel switch, then the switched to wavelength channel is identified. If the switched to wavelength channel is invalid for activation, then the fast path switching was used and the optical network unit is determined to be operating as expected/desired. If the switched to wavelength channel is valid for activation, then the slow path switching was used and the optical network unit is determined to be not operating as expected/desired and the optical network unit is not operating correctly.

Figure 2:
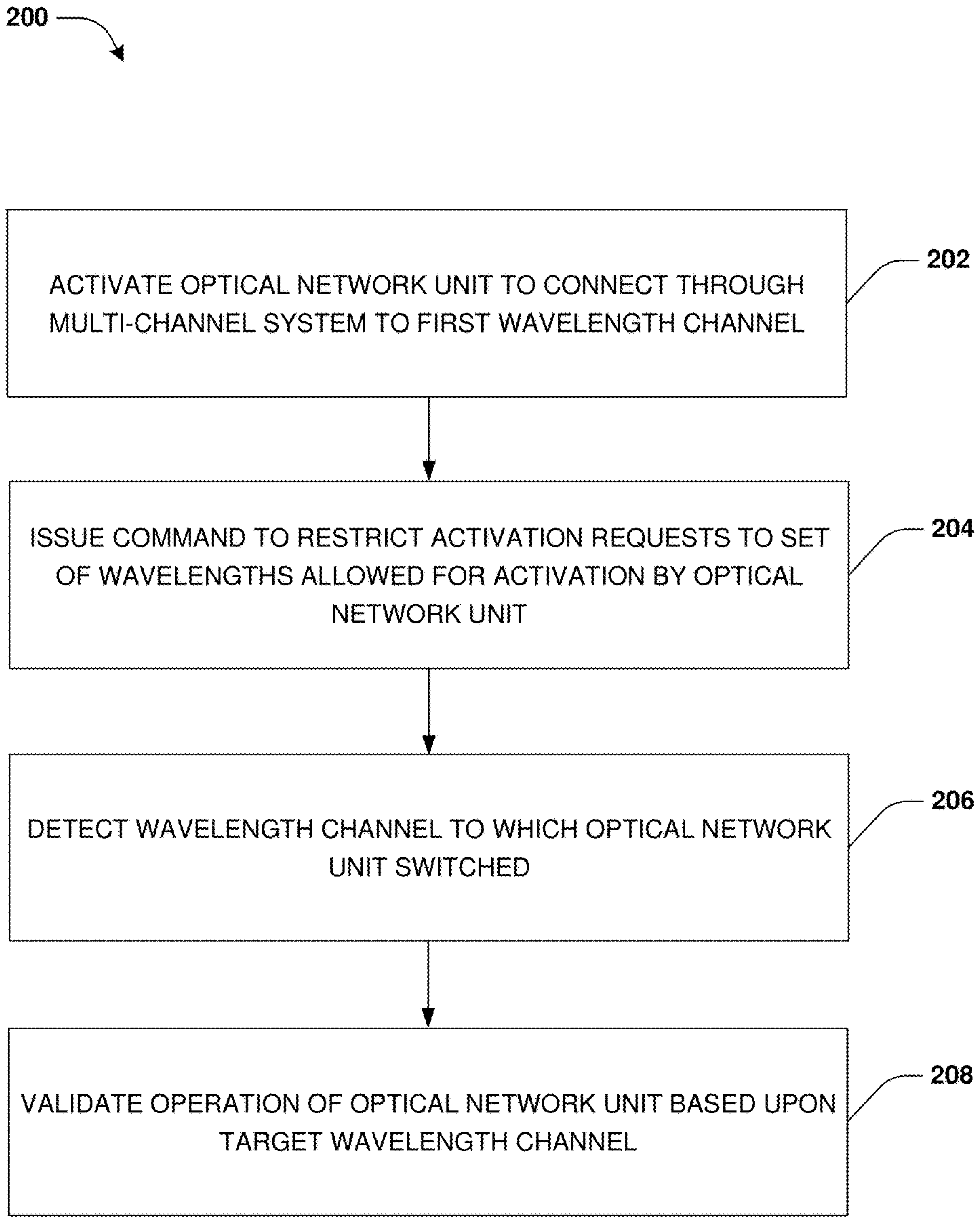
FIG. 2 is a flow chart illustrating an example method for optical network unit testing, in accordance with an embodiment of the present technology.
Figure 3:
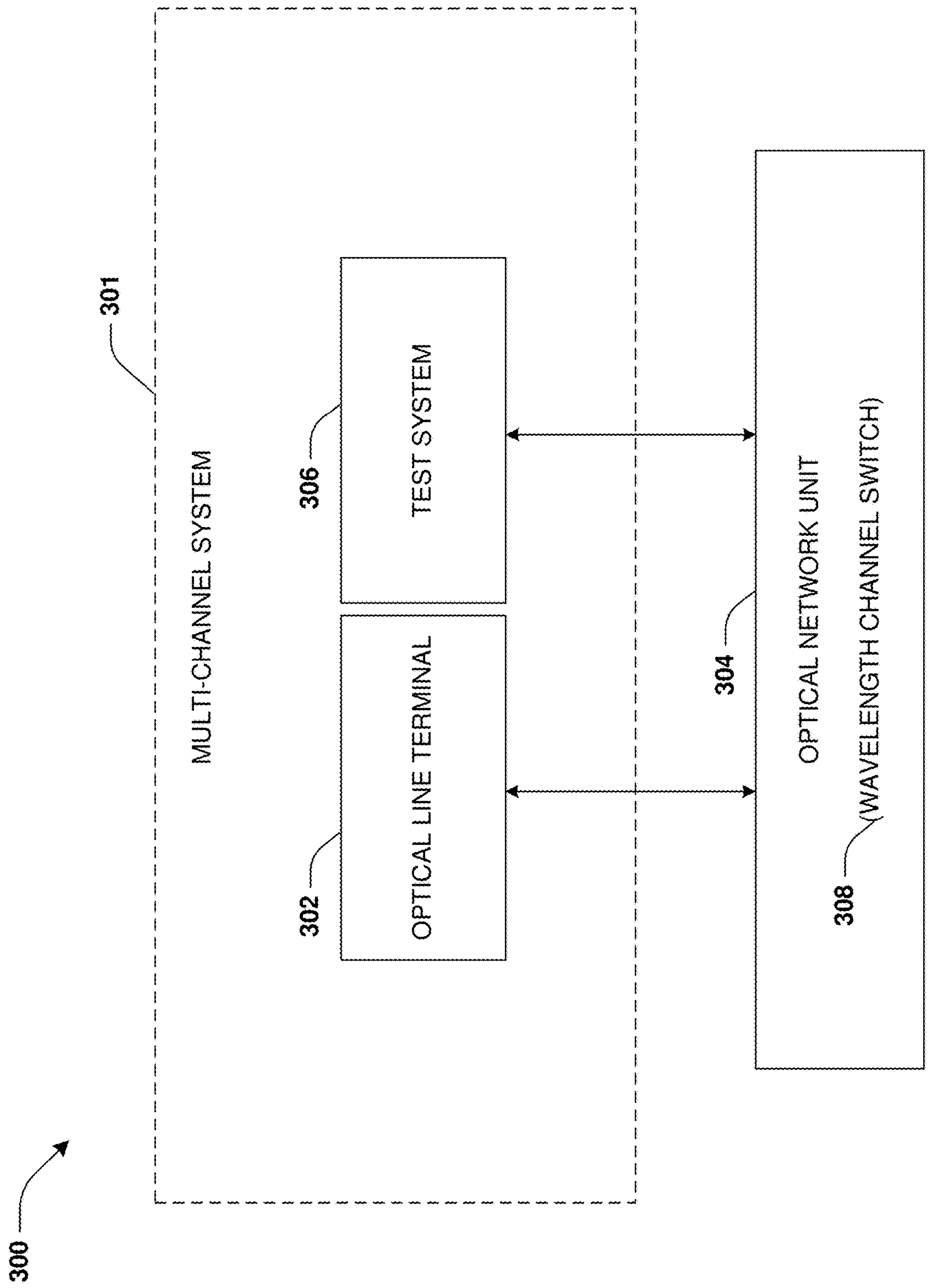
FIG. 3 illustrates an example of a system for optical network unit testing, in accordance with an embodiment of the present technology.
Figure 4:
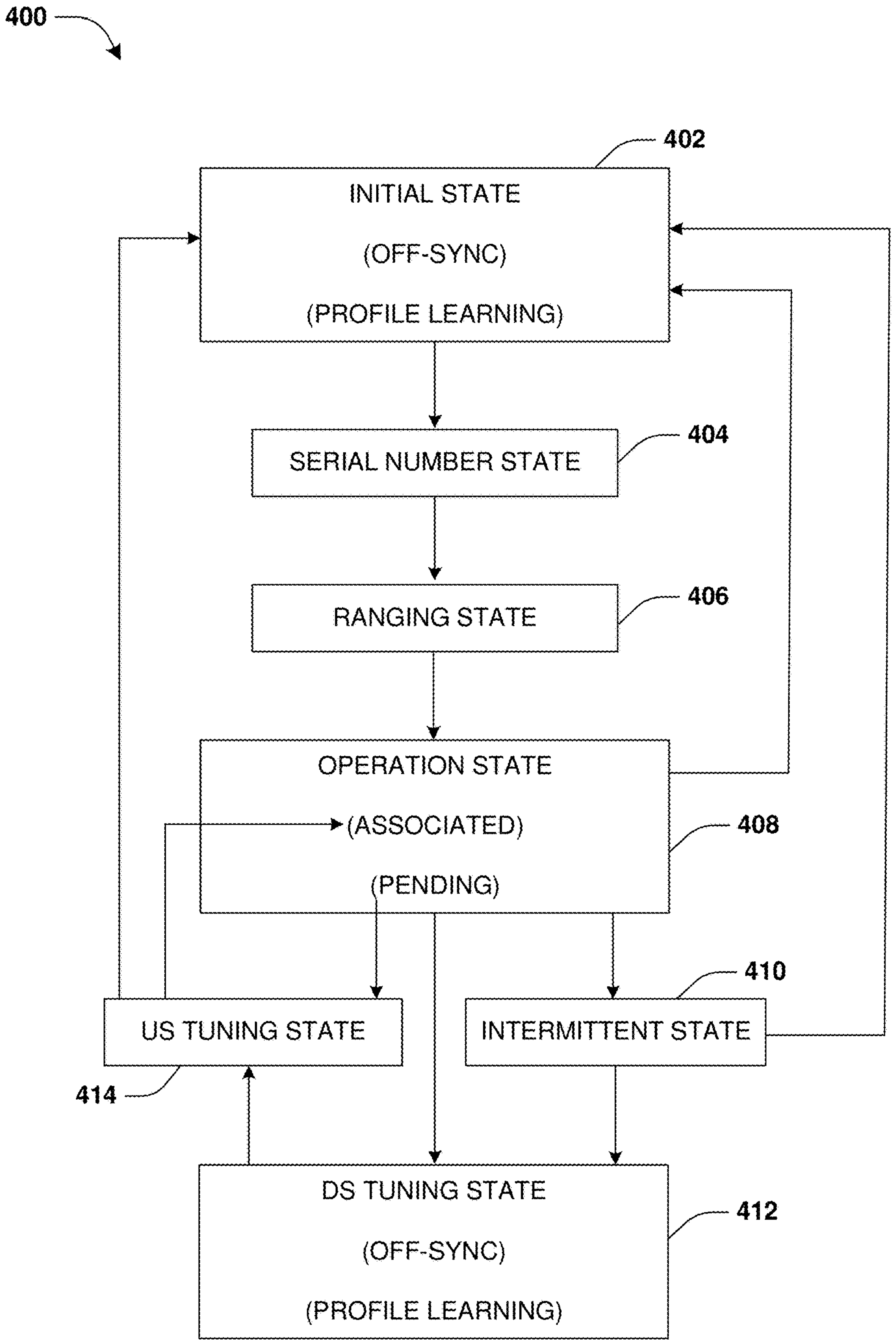
FIG. 4 illustrates an example of a state diagram relating to operation of an optical network unit, in accordance with an embodiment of the present technology.

FIG. 2 is a flow chart illustrating an example method 200 for optical network unit testing, which is described in conjunction with system 300 of FIG. 3 and state diagram 400 of FIG. 4. An optical network unit 304 may be connected to a multi-channel system 301 (e.g., a Next-Generation Passive Optical Network 2 NG-PON2 or any other system/network that provides multiple channels for communication). The multi-channel system 301 may include an optical line terminal 302. The optical line terminal 302 is coupled to the optical network unit 304, and provides user equipment, connected to the optical network unit 304, with connectivity over a network such as to obtain an Internet connection. A test system 306 may be physically connected to the optical line terminal 302 or may be incorporated into the optical line terminal 302. The test system 306 may be implemented as software and/or hardware that is configured to perform wavelength mobility test outcome verification for validating operation of the optical network unit 304. The wavelength mobility test outcome verification may include turning off optical network unit activation in a particular wavelength channel in order to determine whether the optical network unit 304 performs a fast path switching to a target wavelength channel for certain switching scenarios and is thus operating correctly, or performed slow path switching and is thus not operating correctly. In some embodiments, the test system 306 executes the wavelength mobility test outcome verification to perform the method 200 for testing the optical network unit 304.

During operation 202 of method 200, the optical network unit 304 is activated to connect through the multi-channel system 301, such as through the optical line terminal 302, to a wavelength channel. In some embodiments, the optical network unit 304 may initialize into an initial state 402 that includes an off-sync state and a profile learning state where the optical network unit 304 identifies a wavelength channel that is viable. For example, the optical network unit 304 and/or the optical line terminal 302 may perform a discovery process to identify wavelength channel(s), measure round trip propagation delay through the wavelength channel(s), assign a synchronization delay to the optical line terminal 302, and/or setup a management channel. Not all channels discovered by the optical line terminal 302 will work with the optical network unit 304 because some wavelength channels may have incompatible operating parameters, not all wavelength channels may be present, not all wavelength channels may support activation, etc., In this way, the optical network unit 304 performs profile learning for wavelength channels as part of the initial state 402, and the optical network unit 304 is in an off-sync state where the optical network unit 304 is attempting to attain synchronization with the optical network until 304.

After the initial state 402, the optical network unit 304 performs a serial number state 404 and/or a ranging state 406 until a viable wavelength channel is discovered and successfully connected to by the optical network unit 304. During the serial number state 404, the optical network unit 304 receives a registration request from the optical line terminal 302. Upon confirming a type of registration of the registration request, the optical network unit 304 responds with registration information to the optical line terminal 302, which is used by the optical line terminal 302 to determine whether the optical network unit 304 is legitimate. After, the optical network unit 304 enters into the ranging state 406 for distance measuring, and then finally enters into an operation state 408 after connecting to the wavelength channel.

During operation 204 of method 200, the optical network unit 304 receives a command from the optical line terminal 302 while in the operation state 408. In some embodiments, the test system 306 sends the command through the optical line terminal 302 to the optical network unit 304. The command instructs the optical network unit 304 to restrict activation requests to a set of wavelength channels allowed for activation by the optical network unit 304. That is, the optical network unit 304 is restricted to merely wavelength channels within the set of wavelength channels when performing an activation/reactivation that loops through the initial state 402, the serial number state 404, and the ranging state 406 before returning to the operation state 408. This activation/reactivation loop relates to slow path switching that is too slow for certain switching scenarios such as planned handovers between channel wavelengths or fault protection handovers between channel wavelengths in response to fault detection (wavelength protection switching based upon fault detection). As such, wavelength channels excluded from the set of wavelength channels are available for fast path switching. The fast path switching utilize an intermittent state 410 (e.g., a loss of downstream synchronization state), a DS tuning state 412 (e.g., a downstream tuning state that attempts to validate a specified target downstream wavelength channel before resorting to transitioning into the initial state 402 for reactivation through the slow path), and/or a US tuning state 414 (e.g., an upstream tuning state that attempts to obtain an upstream tuning confirmation in a specified target upstream wavelength channel before resorting to transitioning into the initial state 402 for reactivation through the slow path). Thus, the intermittent state 410, the DS tuning state 412, and/or the US tuning state 414 may provide fast path switching back to the operation state 408.

The optical network unit 304 may perform a wavelength channel switch 308 in order to switch from the wavelength channel to a target wavelength channel (e.g., a new/different wavelength channel). During operation 206 of method 200, the target wavelength channel to which the optical network unit 304 switched is identified such as by the test system 306. Because the wavelength mobility test outcome verification turns off optical network unit activation for a specified wavelength channel(s), the optical network unit 304 is restricted from activating in the specified wavelength channel(s) using an activation/reactivation path (slow path switching that goes through the initial state 402, the serial number state 404, and the ranging state 406) as part of the wavelength channel switch 308. If the optical network unit 304 uses the activation/reactivation path for the wavelength channel switch 308, then the optical network unit 304 performs slow path switching to activate in the target wavelength channel that is different than the specified wavelength channel(s).

During operation 208 of method 200, the test system 306 validates operation of the optical network unit 304 based upon whether the target wavelength channel was switched to by the wavelength channel switch 308 through a fast switching path (e.g., a non-activation/non-reactivation path that includes the intermittent state 410, the DS tuning state 412 and/or the US tuning state 414) or a slow switching path (e.g., an activation/reactivation path that includes the initial state 402, the serial number state 404, and the ranging state 406). In some embodiments, the validation is performed as part of the optical network unit 304 performing a controlled wavelength channel handover (a planned handover) in response to a command to switch from the wavelength channel to a different wavelength channel. In some embodiments, the validation is performed within a testing environment (e.g., a lab) hosting the test system 306 and/or the optical network unit 304. In some embodiments, the validation is performed while the optical network unit 304 is deployed and operating within a production environment.

In response to the test system 306 determining that the target wavelength channel is not included within the set of wavelength channels allowed for activation/reactivation through the slow switching path, the test system 306 determines that the optical network unit 304 switched to the target wavelength channel by performing fast path switching and is thus operating correct (valid operation). That is, the optical network unit 304 is validated as operating correctly/as desired based upon the target wavelength channel not supporting activation/reactivation, which indicates that fast path switching was performed. If the optical network unit 304 is validated (e.g., the optical network unit 304 can switch between wavelength channels fast enough to satisfy SLAs and minimize service disruptions such as within 50 ms or less), then the optical network unit 304 is designated for deployment to the production environment if the optical network unit 304 was tested within the test environment, or operation of the optical network unit 304 is retained if the test was performed while already deployed in the production environment.

In response to the test system 306 determining that the target wavelength channel is included within the set of wavelength channels allowed for activation/reactivation through the slow path switching, the test system 306 determines that the optical network unit 304 switched to the target wavelength channel by performing the slow path switching and is thus not operating correct (invalid operation). That is, the optical network unit 304 is determined to not be operating correctly/as desired based upon the target wavelength channel supporting activation/reactivation, which indicates that fast path switching was not performed. If the optical network unit 304 is invalidated (e.g., the optical network unit 304 is not switching between wavelength channels fast enough to satisfy SLAs and minimize service disruptions such as within 50 ms or less), then the optical network unit 304 is designated as not being suitable for deployment to the production environment if the optical network unit 304 was tested within the test environment, or an alert/report is generated that the optical network unit 304 is not operating correctly if the test was performed while already deployed in the production environment (e.g., the report may flag the optical network unit 304 for replacement or may trigger the scheduling of a technician to replace the optical network unit 304).

Figure 5A:
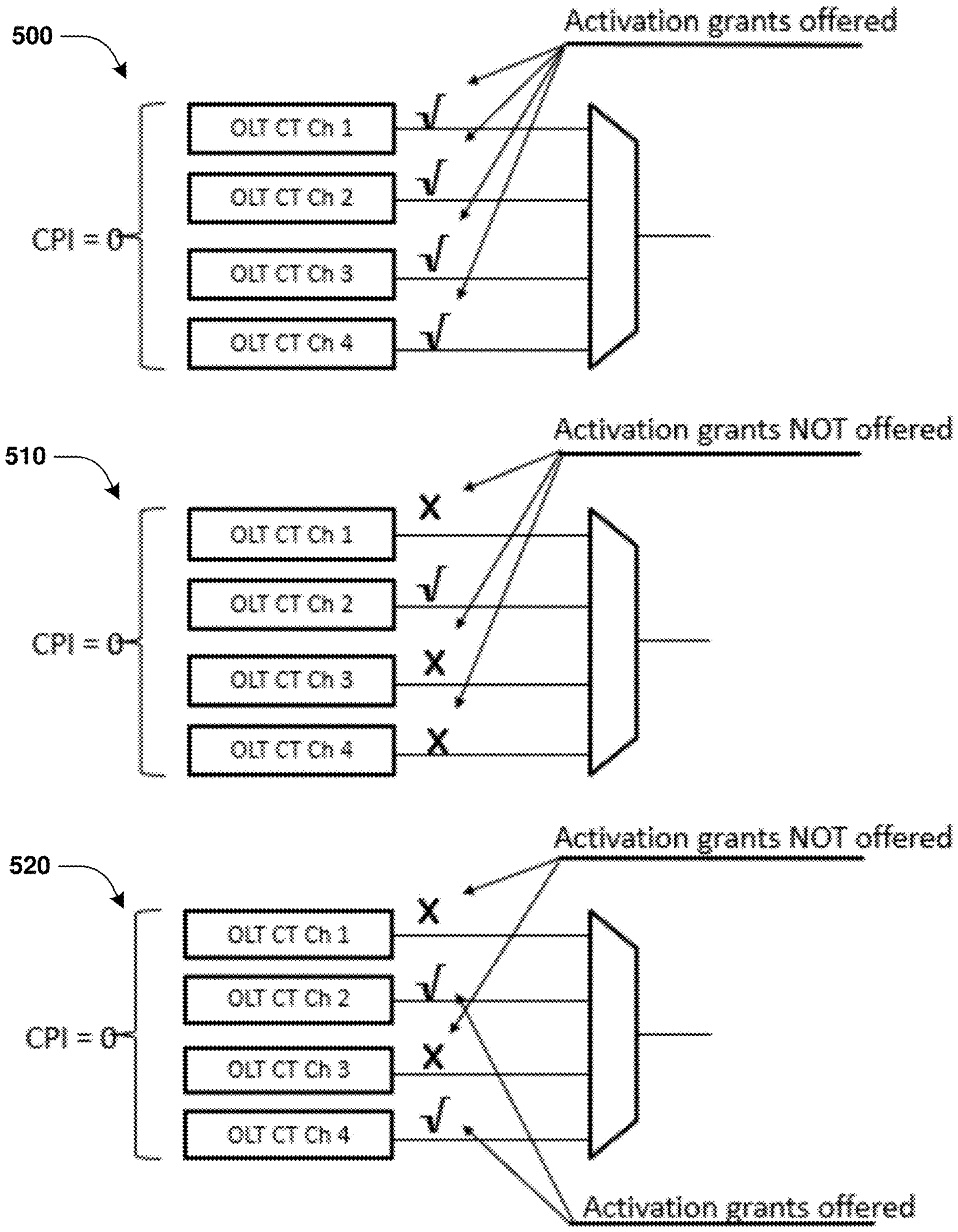
FIG. 5A illustrates an example of performing an optical network unit test, in accordance with an embodiment of the present technology.

FIG. 5A illustrates an example of performing an optical network unit test. As part of performing the optical network unit test to validate the operation of the optical network unit 304, the optical network unit 304 is restricted to using a set of wavelength for activation/reactivation. In some embodiments, the optical network unit 304 is restricted to a first set of wavelength 500 where the optical network unit 304 can activate/reactivate (through slow path switching) to a first wavelength channel, a second wavelength channel, a third wavelength channel, and a fourth wavelength channel.

In some embodiments, the optical network unit 304 is restricted to a second set of wavelength 510 where the optical network unit 304 can activate/reactivate (through slow path switching) to the second wavelength channel, but can perform fast path switching to the first wavelength channel, the third wavelength channel, and the fourth wavelength channel. In some embodiments, the optical network unit 304 is restricted to a third set of wavelength 520 where the optical network unit 304 can activate/reactivate (through slow path switching) to the second wavelength channel and the fourth wavelength channel, but can perform fast path switching to the first wavelength channel and the third wavelength channel.

Figure 5B:
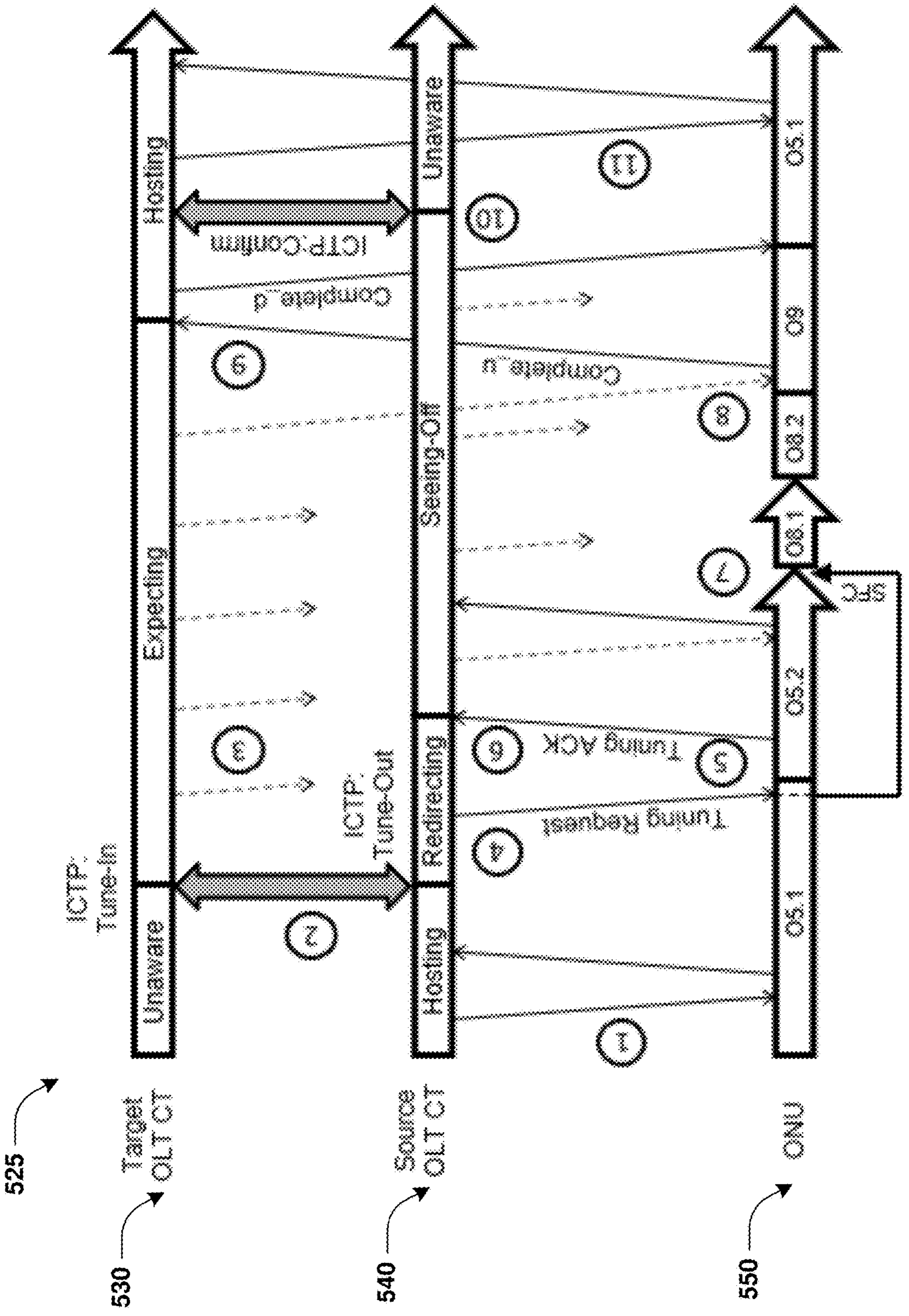
FIG. 5B illustrates an example of a timing diagram for an optical network unit test, in accordance with an embodiment of the present technology.

FIG. 5B illustrates an example of a timing diagram 525 for an optical network unit test. The timing diagram 525 illustrates operation of an optical network unit 550 over time while switching from a source optical line terminal channel termination 540 (a current wavelength channel) to a target optical line terminal channel termination 530 (a target wavelength channel). In some embodiments, the timing diagram 525 relates to the optical network unit 550 performing a planned handover from the source optical line terminal channel termination 540 (the current wavelength channel) to the target optical line terminal channel termination 530 (the target wavelength channel) in response to a command to perform the planned handover. During operation 1, the source optical line terminal channel termination 540 is hosting the optical network unit 550 that is connected to the current wavelength channel. During operation 2, the target optical line terminal channel termination 530 is instructed to wait, during operation 3, for a connection from the optical network unit 550. During operation 4, the optical network unit 550 receives a tuning request from the source optical line terminal channel termination 540. During operation 5, the optical network unit 550 processes the tuning request, and returns a tuning acknowledgement, during operation 6. During operations 7 to 9, the optical network unit 550 performs operations to disconnect (seeing-off) from the source optical line terminal channel termination 540 and connect to the target optical line terminal channel termination 530, during operations 10 and 11. During the operations 1-11, the optical network unit 550 transitions from states O5.1 (e.g., an associated state of the operation state 408), O5.2 (a pending state of the operation state 408), O8.1 (an off-sync state of the DS tuning state 412), O8.2 (a profile learning state of the DS tuning state 408), O9 (the US tuning state 414), and O5.1 (e.g., the associated state of the operation state 408). In this way, the optical network unit 550 switches to the target wavelength channel, which can be detected by a test system in order to validate operation of the optical network unit 550.

Figure 5C:
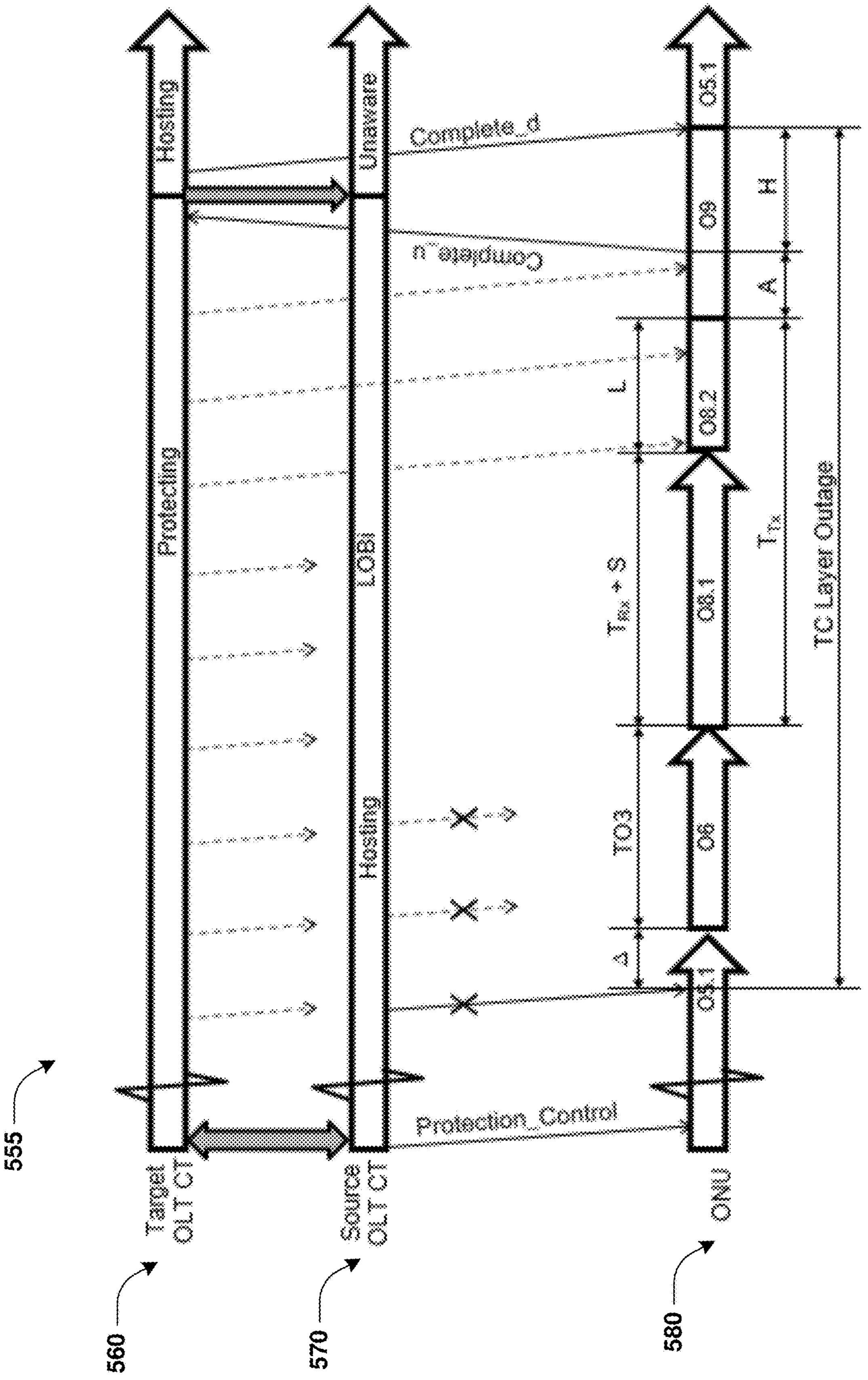
FIG. 5C illustrates an example of a timing diagram for an optical network unit test, in accordance with an embodiment of the present technology.

FIG. 5C illustrates an example of a timing diagram 555 for an optical network unit test. The timing diagram 555 illustrates operation of an optical network unit 580 over time while switching from a source optical line terminal channel termination 570 (a current wavelength channel) to a target optical line terminal channel termination 560 (a target wavelength channel). In some embodiments, the timing diagram 555 relates to the optical network unit 550 performing a fault protection handover from the source optical line terminal channel termination 540 (the current wavelength channel) to the target optical line terminal channel termination 530 (the target wavelength channel) in response to a detected fault. That is, the optical network unit 580 may detect a fault with respect to the source optical line terminal channel termination 570, and thus may implement the fault protection handover as part of fault detection and protection switching. The optical network unit 580 transitions from states O5.1 (e.g., an associated state of the operation state 408), O6 (the intermittent state 410), O8.1 (the off-sync state of the DS tuning state 412), O8.2 (the profile learning state of the DS tuning state 408), O9 (the US tuning state 414), and O5.1 (e.g., the associated state of the operation state 408). In this way, the optical network unit 580 switches to the target wavelength channel, which can be detected by a test system in order to validate operation of the optical network unit 580. The test system may determine a switchover time as $T_{out}$(Switchover)=D+TO3+$T_{out}$(Handover), where $T_{out}$(Handover)=max $\{T_{Rx}$+S+L; $T_{Tx}\}$+A+H; D is the time required to detect a failure in the TC layer; H is the PLOAM handshake time; L is the profile learning time; A is the wait for a directed upstream allocation; S is a time to attain downstream synchronization; $T_{Rx}$ and $T_{Tx}$ are receiver and transmitter tuning times, respectively. The test system uses this information to estimate a TC layer outage time in order to determine whether the optical network unit 580 is operating correctly or is switching too slowly.

According to some embodiments, a method is provided. The method includes activating an optical network unit to connect through a multi-channel system to a wavelength channel; issuing, by an optical line terminal connected to the optical network unit, a command to restrict activation requests to a set of wavelength channels allowed for activation by the optical network unit; in response to detecting a wavelength channel switch being performed by the optical network unit, detecting a target wavelength channel to which the optical network unit switched; and validating operation of the optical network unit based upon the target wavelength channel.

According to some embodiments, the method includes in response to determining that the target wavelength channel is not included the set of wavelength channels allowed for activation by the optical network unit, validating the operation of the optical network unit as performing fast path switching.

According to some embodiments, the method includes in response to determining that the target wavelength channel is included the set of wavelength channels allowed for activation by the optical network unit, determining that the operation of the optical network unit performed slow path switching.

According to some embodiments, the method includes in response to determining that the target wavelength channel is included the set of wavelength channels allowed for activation by the optical network unit, detecting invalid operation of the optical network unit.

According to some embodiments, the wavelengths excluded from the set of wavelength channels are available for fast path switching.

According to some embodiments, the validating is performed as part of a wavelength mobility test outcome verification that turns off optical network unit activation in a specified wavelength channel.

According to some embodiments, the optical network unit is restricted from activating in the specified wavelength channel based upon the optical network unit executing the wavelength channel switch using a reactivation path.

According to some embodiments, the optical network unit activates in the target wavelength channel different than the specified wavelength channel based upon the optical network unit executing the wavelength channel switch using a reactivation path.

According to some embodiments, the method includes in response to determining that the target wavelength channel does not support activation, detecting valid operation of the optical network unit.

According to some embodiments, the method includes in response to determining that the target wavelength channel supports activation, detecting invalid operation of the optical network unit.

According to some embodiments, a system comprising one or more processors configured for executing the instructions to perform operations, is provided. The operations include activating an optical network unit to connect through a multi-channel system to a wavelength channel; issuing, by an optical line terminal connected to the optical network unit, a command to restrict activation requests to a set of wavelength channels allowed for activation by the optical network unit; in response to detecting a wavelength channel switch being performed by the optical network unit, detecting a target wavelength channel to which the optical network unit switched; and validating operation of the optical network unit based upon the target wavelength channel.

According to some embodiments, the operations includes validating the operation of the optical network unit performing a controlled wavelength channel handover where the optical network unit receives a command to switch from the wavelength channel to a different wavelength channel.

According to some embodiments, the operation includes validating, by a test system, the operation of the optical network unit while deployed within a production environment.

According to some embodiments, the test system is physically coupled to the optical line terminal.

According to some embodiments, the optical line terminal comprises the test system.

According to some embodiments, a non-transitory computer-readable medium storing instructions that when executed facilitate performance of operations, is provided. The operations include activating an optical network unit to connect through a multi-channel system to a wavelength channel; issuing, by an optical line terminal connected to the optical network unit, a command to restrict activation requests to a set of wavelength channels allowed for activation by the optical network unit; in response to detecting a wavelength channel switch being performed by the optical network unit, detecting a target wavelength channel to which the optical network unit switched; and validating operation of the optical network unit based upon the target wavelength channel.

According to some embodiments, the operations include validating the operation of the optical network unit performing wavelength protection switching based upon fault detection.

According to some embodiments, the operations include validating, by a test system hosted within a testing environment, the operation of the optical network unit, wherein the optical network unit is designated for deployment to a production environment based upon successful validation.

According to some embodiments, the operations include validating, by a test system hosted within a testing environment, the operation of the optical network unit, wherein the optical network unit is designated not ready for deployment to a production environment based upon unsuccessful validation.

According to some embodiments, the operations include in response to determining that the target wavelength channel is not included the set of wavelength channels allowed for activation by the optical network unit, validating the operation of the optical network unit as performing fast path switching; and in response to determining that the target wavelength channel is included the set of wavelength channels allowed for activation by the optical network unit, determining that the operation of the optical network unit performed slow path switching.

Figure 6:
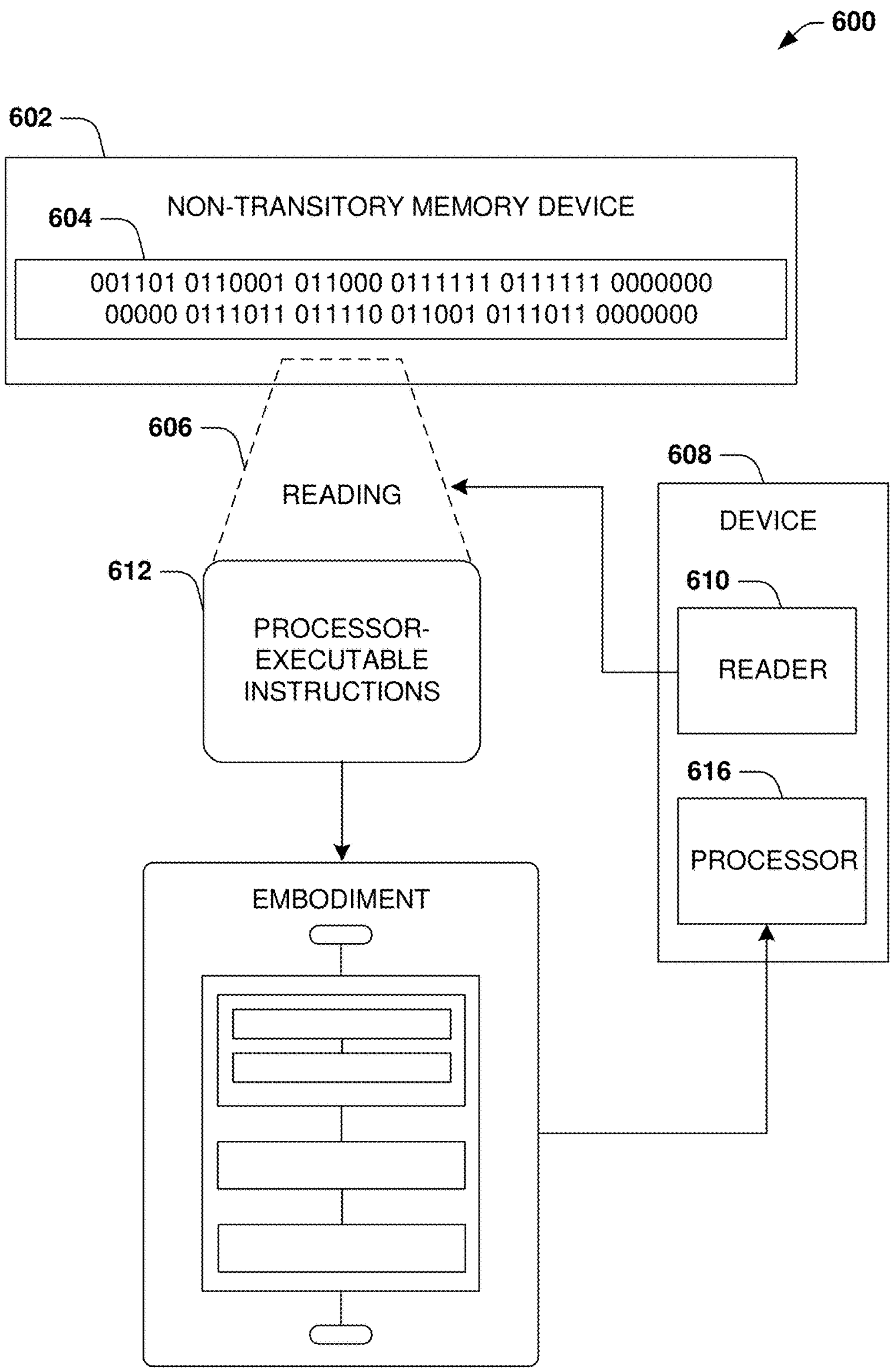
FIG. 6 is an illustration of example networks that may utilize and/or implement at least a portion of the techniques presented herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 200 of FIG. 2, for example. In some embodiments, the processor-executable instructions 612 are configured to cause implementation of a system, such as at least some of the example system 100 of FIG. 1, at least some of example system 300 of FIG. 3.

Figure 7:
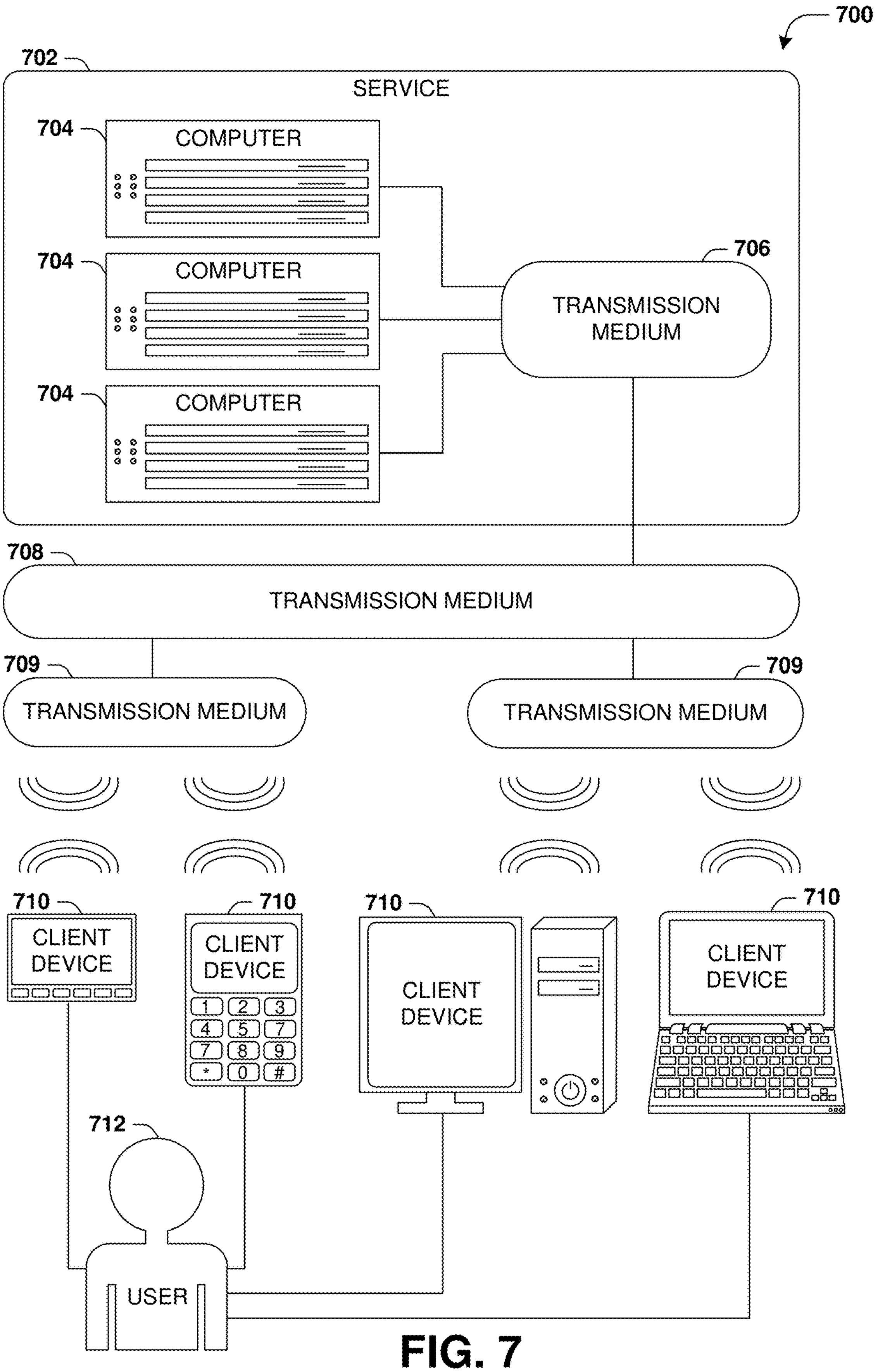
FIG. 7 is an illustration of a scenario involving an example configuration of a computer that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

In some embodiments, the computers 704 may be host devices and/or the client device 710 may be devices attempting to communicate with the computer 704 over buses for which device authentication for bus communication is implemented.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 709 provided by a cellular provider. As a second such example, one or more client devices 710 may communicate with the service 702 by connecting to the transmission medium 708 via a transmission medium 709 provided by a location such as the user's home or workplace (e.g., a Wi-Fi (Institute of Electrical and Electronics Engineers (IEEE) Standard 802.11) network or a Bluetooth (IEEE Standard 802.15.1) personal area network). In this manner, the computers 704 and the client devices 710 may communicate over various types of transmission mediums.

Figure 8:
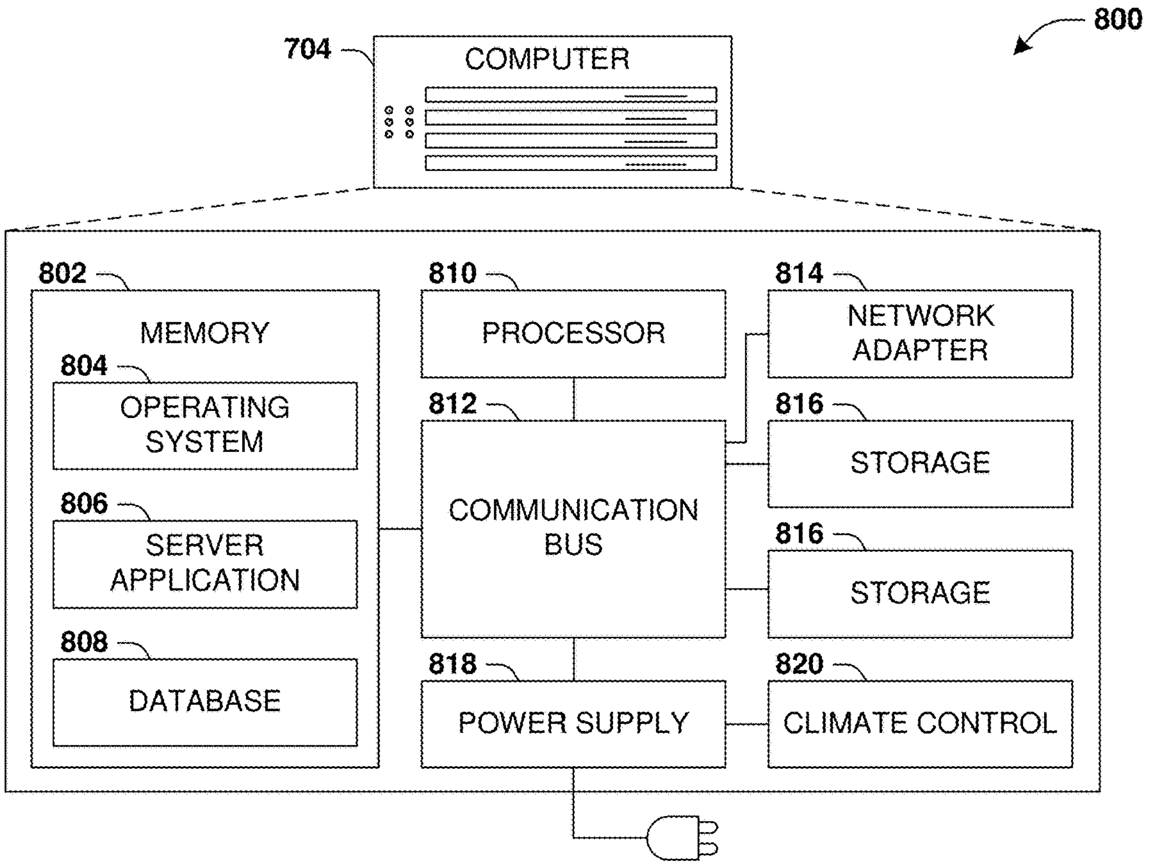
FIG. 8 is an illustration of a scenario involving an example configuration of a client that may utilize and/or implement at least a portion of the techniques presented herein.

FIG. 8 presents a schematic architecture diagram 800 of a computer 804 that may utilize at least a portion of the techniques provided herein. Such a computer 804 may vary widely in configuration or capabilities, alone or in conjunction with other computers, in order to provide a service.

The computer 804 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 804 may comprise memory 802 storing various forms of applications, such as an operating system 804; one or more computer applications 806; and/or various forms of data, such as a database 808 or a file system. The computer 804 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 804 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 804 with at least one other computer. Other components that may optionally be included with the computer 804 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 804 to a state of readiness.

The computer 804 may operate in various physical enclosures, such as a desktop or tower, and/or may be integrated with a display as an "all-in-one" device. The computer 804 may be mounted horizontally and/or in a cabinet or rack, and/or may simply comprise an interconnected set of components. The computer 804 may comprise a dedicated and/or shared power supply 818 that supplies and/or regulates power for the other components. The computer 804 may provide power to and/or receive power from another computer and/or other devices. The computer 804 may comprise a shared and/or dedicated climate control unit 820 that regulates climate properties, such as temperature, humidity, and/or airflow. Many such computers 804 may be configured and/or adapted to utilize at least a portion of the techniques presented herein.

Figure 9:
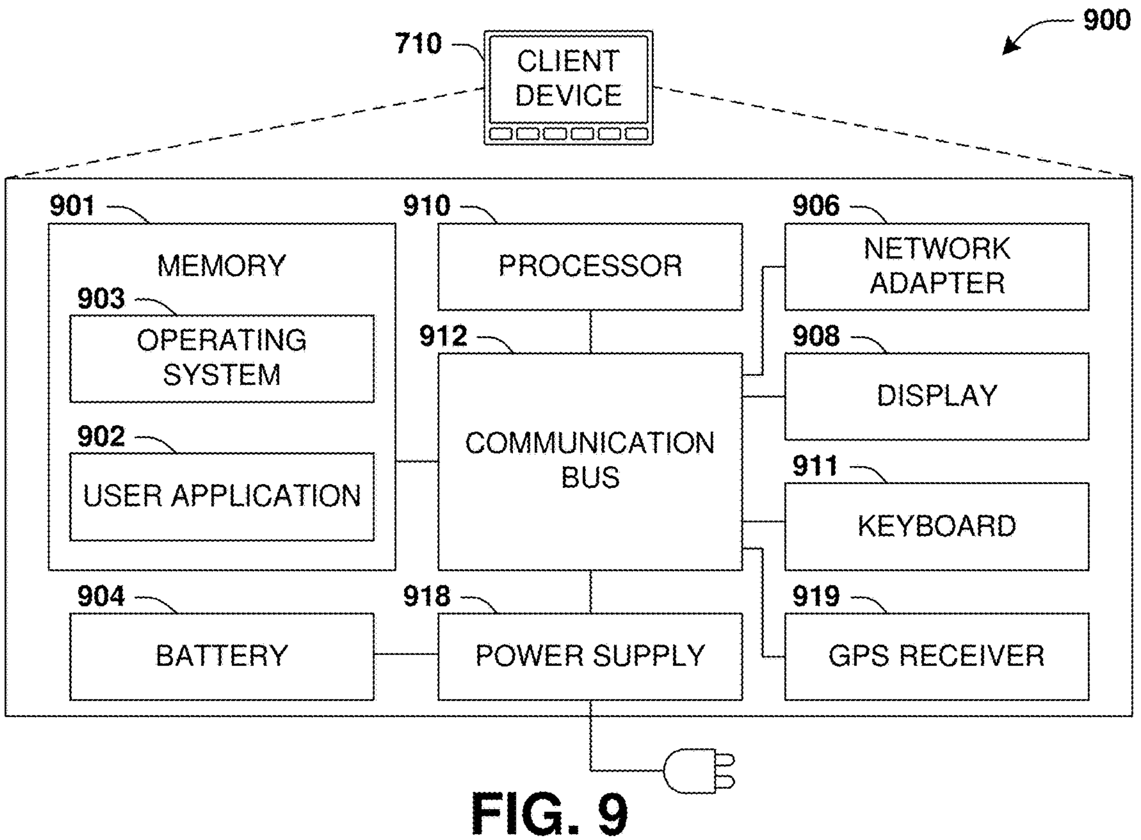
FIG. 9 is an illustration of a scenario featuring an example non-transitory machine readable medium in accordance with one or more of the provisions set forth herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed:

1. A method, comprising:

activating an optical network unit to connect through a multi-channel system to a wavelength channel;

issuing, by an optical line terminal connected to the optical network unit, a command to restrict activation requests to a set of wavelength channels allowed for activation by the optical network unit;

in response to detecting a wavelength channel switch being performed by the optical network unit, detecting a target wavelength channel to which the optical network unit switched; and validating, by a test system, operation of the optical network unit based upon the target wavelength channel.

2. The method of claim 1, wherein the validating further comprises:

in response to determining that the target wavelength channel is not included the set of wavelength channels allowed for activation by the optical network unit, validating the operation of the optical network unit as performing fast path switching.

3. The method of claim 1, wherein the validating further comprises:

in response to determining that the target wavelength channel is included the set of wavelength channels allowed for activation by the optical network unit, determining that the operation of the optical network unit performed slow path switching.

4. The method of claim 1, wherein the validating further comprises:

in response to determining that the target wavelength channel is included the set of wavelength channels allowed for activation by the optical network unit, detecting invalid operation of the optical network unit.

5. The method of claim 1, wherein the wavelengths excluded from the set of wavelength channels are available for fast path switching.

6. The method of claim 1, wherein the validating is performed as part of a wavelength mobility test outcome verification that turns off optical network unit activation in a specified wavelength channel.

7. The method of claim 6, wherein the optical network unit is restricted from activating in the specified wavelength channel based upon the optical network unit executing the wavelength channel switch using a reactivation path.

8. The method of claim 6, wherein the optical network unit activates in the target wavelength channel different than the specified wavelength channel based upon the optical network unit executing the wavelength channel switch using a reactivation path.

9. The method of claim 1, wherein the validating further comprises:

in response to determining that the target wavelength channel does not support activation, detecting valid operation of the optical network unit.

10. The method of claim 1, wherein the validating further comprises:

in response to determining that the target wavelength channel supports activation, detecting invalid operation of the optical network unit.

11. A system, comprising:

one or more processors configured for executing instructions to perform operations comprising:

activating an optical network unit to connect through a multi-channel system to a wavelength channel;

issuing, by an optical line terminal connected to the optical network unit, a command to restrict activation requests to a set of wavelength channels allowed for activation by the optical network unit;

in response to detecting a wavelength channel switch being performed by the optical network unit, detecting a target wavelength channel to which the optical network unit switched; and validating, by a test system, operation of the optical network unit based upon the target wavelength channel.

12. The system of claim 11, wherein the operations further comprise:

validating the operation of the optical network unit performing a controlled wavelength channel handover where the optical network unit receives a command to switch from the wavelength channel to a different wavelength channel.

13. The system of claim 11, wherein the operations further comprise:

validating, by the test system, the operation of the optical network unit while deployed within a production environment.

14. The system of claim 13, wherein the test system is physically coupled to the optical line terminal.

15. The system of claim 13, wherein the optical line terminal comprises the test system.

16. A non-transitory computer-readable medium storing instructions that when executed facilitate performance of operations comprising:

activating an optical network unit to connect through a multi-channel system to a wavelength channel;

issuing, by an optical line terminal connected to the optical network unit, a command to restrict activation requests to a set of wavelength channels allowed for activation by the optical network unit;

in response to detecting a wavelength channel switch being performed by the optical network unit, detecting a target wavelength channel to which the optical network unit switched; and validating, by a test system, operation of the optical network unit based upon the target wavelength channel.

17. The non-transitory computer-readable medium of claim 16, wherein the operations further comprise:

validating the operation of the optical network unit performing wavelength protection switching based upon fault detection.

18. The non-transitory computer-readable medium of claim 16, wherein the operations further comprise:

validating, by the test system hosted within a testing environment, the operation of the optical network unit, wherein the optical network unit is designated for deployment to a production environment based upon successful validation.

19. The non-transitory computer-readable medium of claim 16, wherein the operations further comprise:

validating, by the test system hosted within a testing environment, the operation of the optical network unit, wherein the optical network unit is designated not ready for deployment to a production environment based upon unsuccessful validation.

20. The non-transitory computer-readable medium of claim 16, wherein the operations further comprise:

in response to determining that the target wavelength channel is not included the set of wavelength channels allowed for activation by the optical network unit, validating the operation of the optical network unit as performing fast path switching; and in response to determining that the target wavelength channel is included the set of wavelength channels allowed for activation by the optical network unit, determining that the operation of the optical network unit performed slow path switching.

* * * * *